US005793398A

United States Patent [19]

Hennig

[11] Patent Number: 5,793,398

[45] Date of Patent: Aug. 11, 1998

[54] HOT MELT INK JET SHADEMARKING SYSTEM FOR USE WITH AUTOMATIC FABRIC SPREADING APPARATUS

[75] Inventor: Cynthia Lou Hennig, Dallas, Tex.

[73] Assignee: Levi Strauss & Co., Del.

[21] Appl. No.: 564,588

[22] Filed: Nov. 29, 1995

[51] Int. Cl.[6] .......... B41J 2/175; B41J 29/393; B41J 2/00; C09D 11/00

[52] U.S. Cl. .......... 347/88; 347/19; 347/99; 347/110

[58] Field of Search .......... 347/88, 99, 19, 347/2, 110, 106, 107, 102, 16; 270/31; 101/92

[56] References Cited

U.S. PATENT DOCUMENTS

| | | | |
|---|---|---|---|
| Re. 34,029 | 8/1992 | Ball | 346/1.1 |
| 3,653,932 | 4/1972 | Berry et al. | 106/22 |
| 3,715,219 | 2/1973 | Kurz et al. | 106/22 |
| 3,902,413 | 9/1975 | Powell et al. | 101/111 |
| 4,092,020 | 5/1978 | Blessing | 270/31 |
| 4,390,369 | 6/1983 | Merritt et al. | 106/31 |
| 4,484,948 | 11/1984 | Merritt et al. | 106/31 |
| 4,580,147 | 4/1986 | DeYoung et al. | 346/140 |
| 4,609,924 | 9/1986 | De Young | 346/1.1 |
| 4,659,383 | 4/1987 | Lin et al. | 106/27 |
| 4,684,956 | 8/1987 | Ball | 347/88 |
| 4,686,540 | 8/1987 | Leslie et al. | 347/16 |
| 4,702,742 | 10/1987 | Iwata et al. | 8/495 |
| 4,725,849 | 2/1988 | Koike et al. | 346/1.1 |
| 4,751,528 | 6/1988 | Spehrley, Jr. et al. | 347/88 |
| 4,786,288 | 11/1988 | Handa et al. | 8/495 |
| 4,791,439 | 12/1988 | Guiles | 346/140 |
| 4,814,786 | 3/1989 | Hoisington et al. | 347/88 |
| 4,849,770 | 7/1989 | Koike et al. | 346/1.1 |
| 4,909,879 | 3/1990 | Ball | 156/164 |
| 4,969,951 | 11/1990 | Koike et al. | 106/22 |
| 5,043,741 | 8/1991 | Spehrley, Jr. | 346/1.1 |
| 5,250,121 | 10/1993 | Yamamoto et al. | 106/22 |
| 5,371,521 | 12/1994 | Wehrmann | 346/134 |
| 5,386,224 | 1/1995 | Deur et al. | 347/88 |
| 5,546,109 | 8/1996 | Nakno | 347/92 |
| 5,589,871 | 12/1996 | Aoki et al. | 347/237 |

FOREIGN PATENT DOCUMENTS

| | | | |
|---|---|---|---|
| 0 097 823 | 1/1984 | European Pat. Off. | B41J 3/04 |
| 34 36 231 A | 4/1986 | Germany . | |
| 63069684 | 3/1988 | Japan . | |

*Primary Examiner*—Benjamin R. Fuller
*Assistant Examiner*—Thien Tran
*Attorney, Agent, or Firm*—Medlen & Carroll, LLP

[57] ABSTRACT

An improved fabric handling device equipped with a hot melt ink jet shademarking system for the contactless shademarking of processed fabric is described as follows: a series of commercial ink jet printheads are mounted on a head mount beam attached to a fabric spreader or loom weaving apparatus, and are attached via umbilical lines to a hot melt ink reservoir and pressure regulating system. A control system is provided including an individual controller for each printhead. A central controller is operatively connected to and directs the individual controllers, the hot melt ink jet reservoir, and the pressure supply and pressure regulator. After receiving information from the operator regarding the fabric being shademarked, the central controller can automatically select an appropriate marking configuration for maximum visibility and minimum ink consumption. The present hot melt ink jet shademarking system provides a clear, identifiable image on the passing fabric substrate while avoiding problems with fabric tearing, stretching or bleed through.

22 Claims, 8 Drawing Sheets

HOT MELT INK JET SHADEMARKING SYSTEM FOR USE WITH AUTOMATIC FABRIC SPREADING APPARATUS

FIELD OF THE INVENTION

The present invention relates generally to fabric processing and marking systems, and more particularly to an ink jet shademarking system incorporated into an automated fabric handling device.

BACKGROUND OF THE INVENTION

It is critical in the garment and apparel manufacturing industries to maintain the roll integrity of cut fabric pieces during the sewing process, to ensure that the various pieces ultimately sewn together in a completed garment are substantially uniform in coloration and shading. Since the component parts of garments are often cut simultaneously from many layers of material, an identification mechanism is essential to avoid the inclusion of mismatched fabric pieces. This identification is frequently accomplished by shademarking the back side of the material as it is processed through either a fabric spreader or a loom weaving apparatus, so that after the cutting process is complete the markings on the various fabric pieces can be matched to ensure that only consistent fabric sources are used.

Prior art shademarking devices utilize only conventional contact printing techniques, often with a mechanical stamping apparatus such as that disclosed in Blessing, U.S. Pat. No. 4,092,020 or Powell et al., U.S. Pat. No. 3,902,413. Unfortunately, these devices often fail to produce sufficiently visible characters, or alternatively the characters may be unrecognizable due to the spreading of the applied ink on the rough weave surfaces of fabric and textiles. This problem is compounded in shademarking systems utilizing water- or oil-based ink compositions, which can bleed through and stain light-colored fabrics. In addition, the fabric can tear if the printing mechanism snags on the passing fabric, and the rollers of the conventional printing mechanisms can further stretch and damage the fabric. Moreover, these contact-oriented marking systems must be inspected and cleaned several times a day, to remove the fabric fibers and lint that collect on the printing mechanism while it is in contact with the moving fabric.

What is needed is a contactless shademarking system incorporated into a fabric handling device, which can generate highly visible and accurate identification markings on the back side of the fabric, while reducing both routine maintenance requirements and the risk of accidental ink spillage. The system should provide a comprehensive control means offering a wide choice of character markings to ensure maximum visibility and minimum ink consumption.

SUMMARY OF THE INVENTION

Accordingly, it is an object of the present invention to overcome the problems encountered in the prior art, by providing a contactless shademarking system incorporated into a fabric handling device. The improved shademarking system of the present invention applies a wax or polymer composition, with or without pigment, to the back side of the fabric as it passes through the fabric handling device, by the use of hot melt ink jet technology. The hot melt ink jet marking system of the present invention provides an accurate reproduction of the shademarking character or symbol, eliminating the prior art problems of ink smearing and bleed-through on light-colored fabrics.

Moreover, the incorporation of ink jet technology into the fabric spreading process also enables the operator to switch between any number of images and characters without the need to halt the production line and change printing plates. In the present invention, the ideal character or graphic symbol can be manually selected, or automatically changed at the beginning of each roll, for a given type of material, to ensure maximum visibility and minimum ink consumption. It is also intended that the present invention will automatically adjust the firing of the ink jet printheads based on information regarding the width of the fabric which is selected by the operator.

The present invention provides an array of ink jet heads mounted on a head mount beam, which is positioned on a fabric spreader so that the back side of the moving substrate of fabric travels past the ink jet printheads. A single reservoir is preferably supplied for providing the marking composition to the printheads, with an automatic ink level sensing system that alerts the operator to refill the reservoir well before the system runs out. It is further contemplated that the ink jets would be maintained at a higher temperature than the reservoir, and that a solid print medium could be used to fill the reservoir for ease of handling and to create a spill-free environment. The color of the ink composition can also be easily changed to ensure maximum visibility on different color fabrics.

The present invention also provides a central control means to coordinate the operation of the printheads, with a separate control panel for the operator to select the fabric width as well as manage the printheads themselves. The present invention further incorporates the programming for the central control means, including instructions for printing the specific characters or graphic symbols. It is intended that the programming of the present invention will optimize the characters and graphic symbols for each type and color of fabric, to ensure ease of recognition and minimum ink consumption. The information entered by the operator will allow the central control means to select the appropriate image and relay the image data to the printheads for printing.

The present invention also contemplates a process for the marking of fabric and textiles on a fabric spreading machine, which comprises applying to the fabric one or more images by means of the hot melt ink jet apparatus disclosed above.

DETAILED DESCRIPTION OF THE PREFERRED EMBODIMENT

In the hot melt ink jet shademarking system of the present invention, a Head Mount Beam (10) is attached to a fabric handling device (5) such as, for example, a fabric spreader or loom, via conventional bracketry. See FIG. 1. It is contemplated that any make and model of fabric spreading device, such as those manufactured by Saber Industries, Nashville, Tenn., or Niebuhr/Gerber Garment Technology, Inc., Tolland, Conn., would be suitable for use with the present invention. It is further contemplated that the present invention can be easily configured for attachment to other types of fabric handling devices, such as loom weaving devices, with only minimal alterations.

Figure 1:
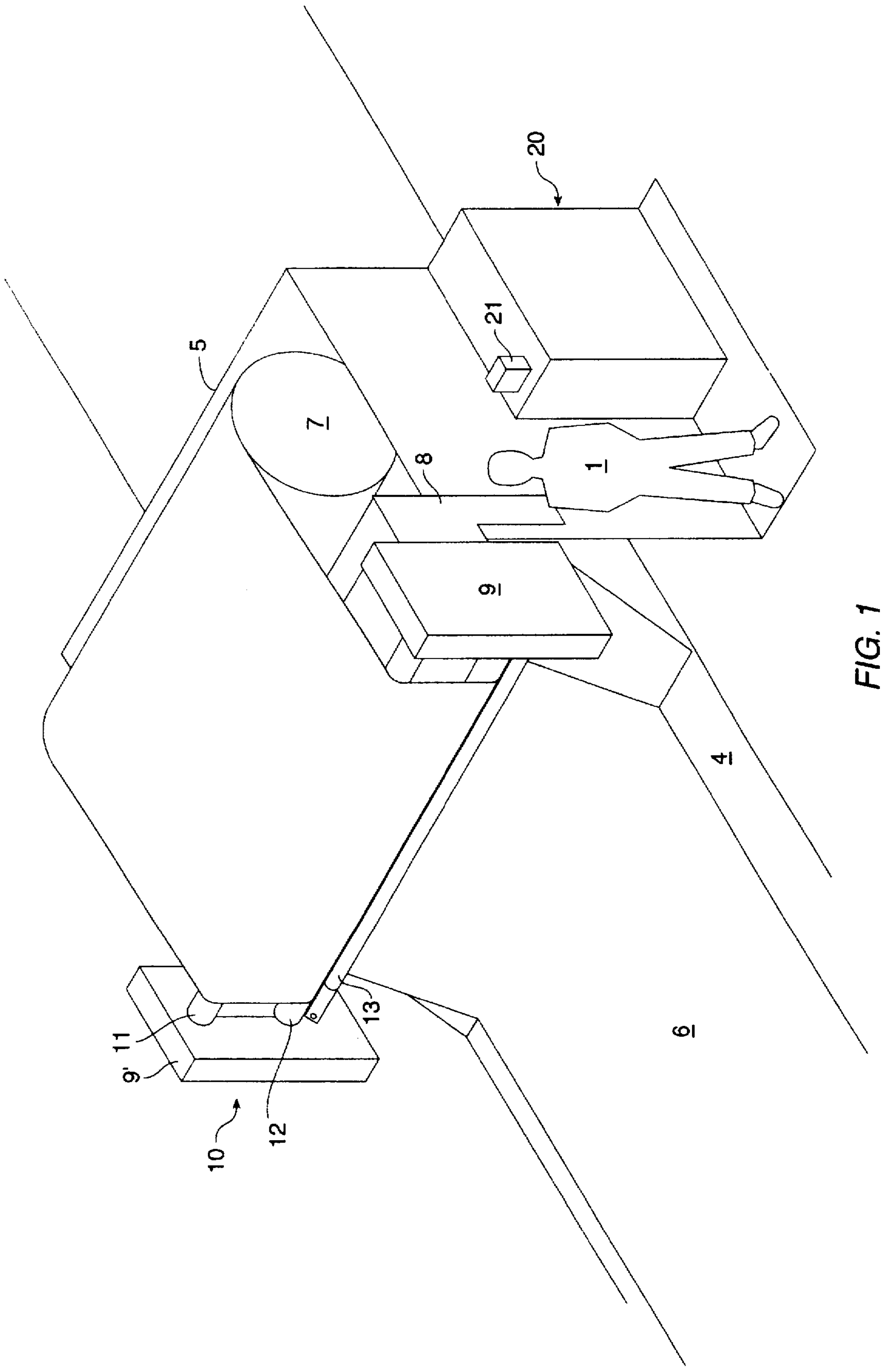
FIG. 1 is an overhead perspective view of a contactless shademarking system of the present invention, mounted on a fabric handling device with a processed roll of fabric.

As shown in FIG. 1, in the present invention the fabric (6) is unwound from a driven roll (7) and directed over the Head Mount Beam (10), by means of top (11) and bottom (12) rollers located on the Head Mount Beam (10). See FIG. 4A. A dancer bar (13) is mounted on the fabric handling device (5) beneath the Head Mount Beam (10) to redirect the fabric from the Head Mount Beam (10), and to maintain sufficient tension in the fabric (6) as it passes the printheads (PH1–PH13). See FIG. 1. In a preferred embodiment, the fabric (6) is horizontally redirected around the dancer bar (13) and laid out on a flat surface in a continuous manner, by means of a conventional carriage mechanism (not shown) underneath the fabric handling device (5).

Figure 2:
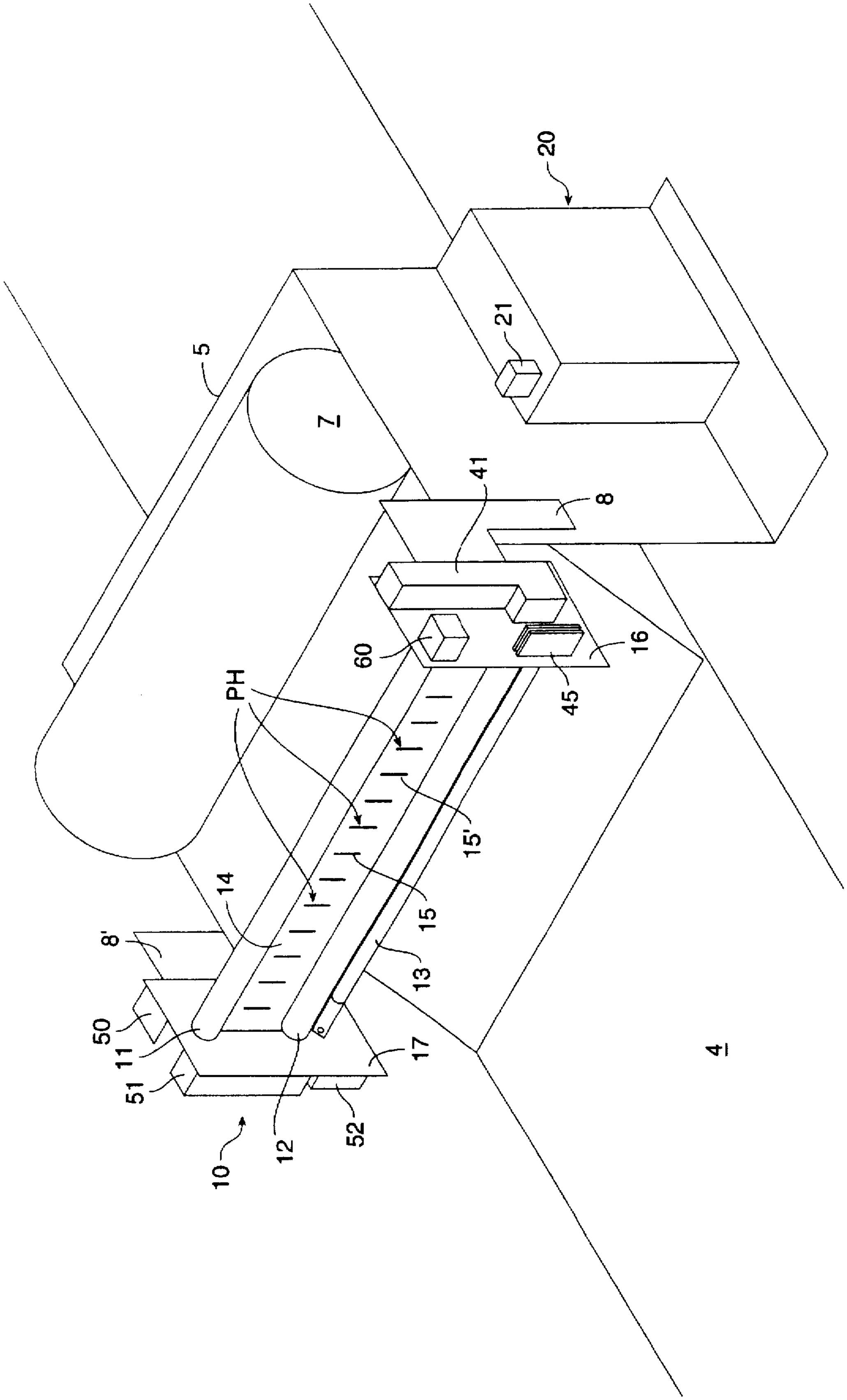
FIG. 2 is an overhead perspective view of a contactless shademarking system of the present invention, mounted on a fabric handling device without roll of fabric threaded.

A series of commercial ink jet printheads (PH1–PH13) are positioned along the Head Mount Beam (10) and uniformly spaced to cover a predetermined maximum fabric width. See FIGS. 2 & 3. In the preferred embodiment shown in FIG. 2, there are thirteen hot melt ink jet printheads (PH1–PH13) spaced apart on the Head Mount Beam (10) by 5.5 inches, covering a maximum fabric width of 72 inches. It is contemplated that each printhead (PH1–PH13) will repeatedly and simultaneously image the same alphanumeric character or graphic symbol, which will be defined in a bit-mapped format and stored in the memory of a central control means. (20)

Figure 3:
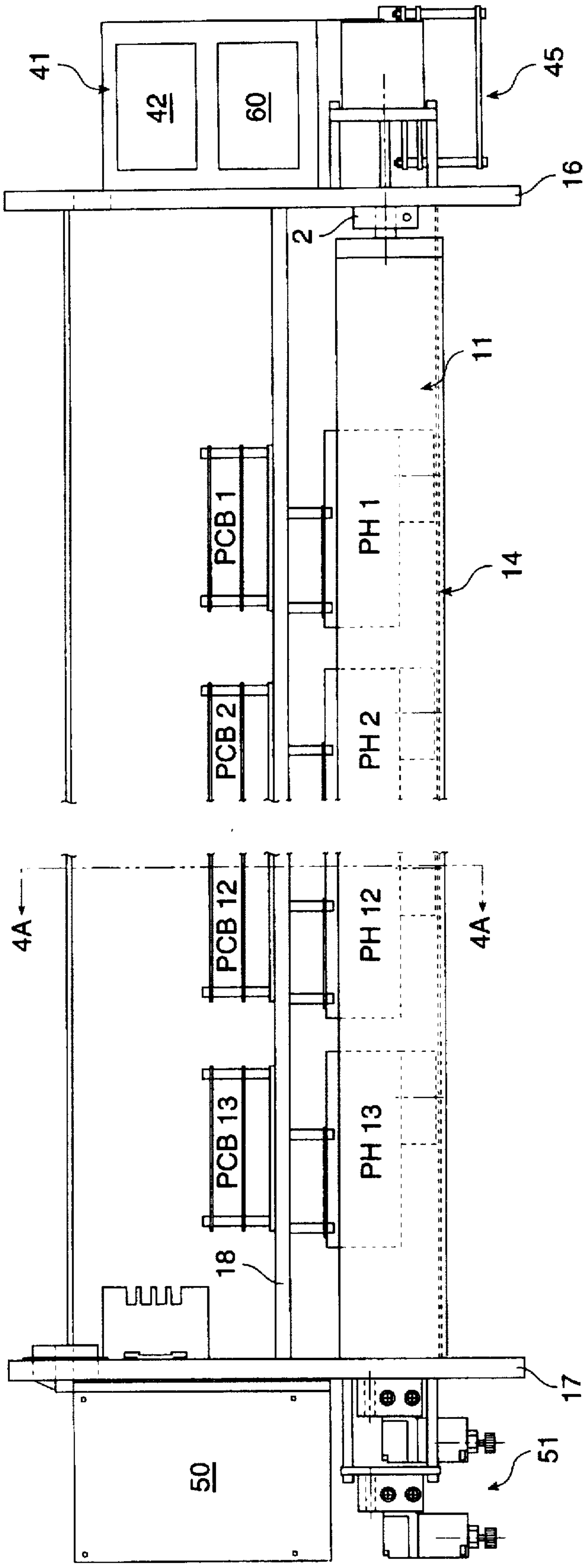
FIG. 3 is a cut-away overhead view of the left and right ends of the Head Mount Beam, showing the printheads beneath the top roller.
Figure 4A:
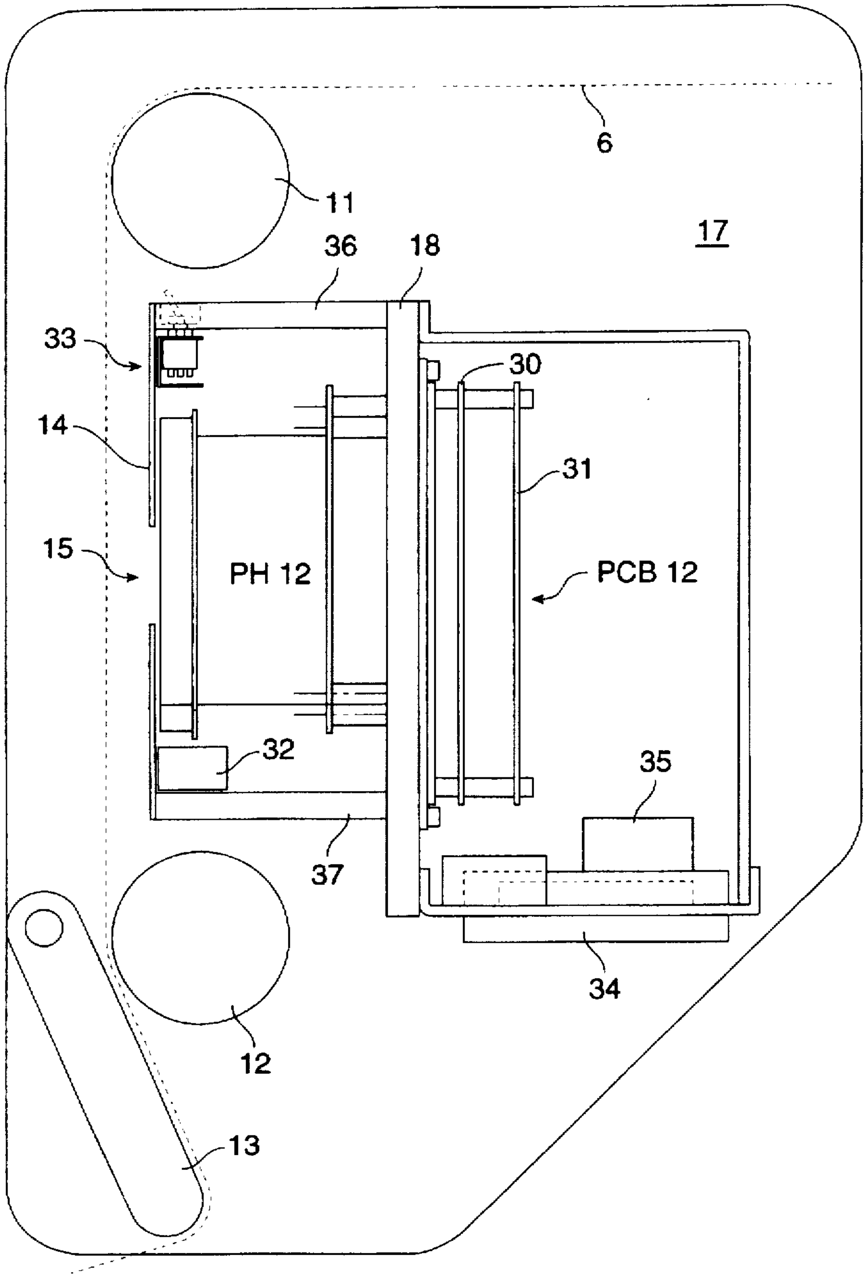
FIG. 4A is a cross-sectional view of the Head Mount Beam identified in FIG. 3, showing the printhead mechanism and associated circuit boards.

Each printhead (PH1–PH13) is preferably controlled by its own printhead circuit board set (PCB1–PCB13), which is operatively connected with the central control means (20) preferably via a serial communication link. In the preferred embodiment, these printhead circuit board sets (PCB1–PCB13) are located adjacent to the printheads (PH1–PH13) on the Head Mount Beam (10). See FIG. 3. As shown in FIG. 4A, the printhead circuit board set (PCB1–PCB13) further consists of a head controller board (31) and a head driver board (30). These circuit boards (PCB1–PCB13) are provided with power and high speed image data from the central control means (20), for printing the desired character or graphic symbol.

The image can be formed by any suitable ink jet printing technique. The preferred embodiment utilizes an on-demand ink jet printing technique, whereby the marking composition is fed under pressure from a reservoir to the printheads, via a valving means described in more detail below. Piezoelectric projection is then used to dispense the marking composition through the nozzle of the printhead as discrete droplets, in the desired sequence to form the required image on the fabric. Typical of ink jet printheads suitable for use in the present invention are the Model HDS 96i industrial printheads manufactured by Spectra, Inc., Hanover, N.H.

The present invention also preferably incorporates an individual drip tray (32) underneath each printhead (see FIG. 4B), as well as a purge and test fire switch (33). The purge and test fire switch (33) allows the operator to purge each umbilical and printhead, in order to clear the lines of air bubbles that are created when the machine is turned off. An in-line filter (not shown) is provided in the umbilical line leading to the printhead, which in a preferred embodiment consists of a sintered metal filter placed in the umbilical line (40) before the connection with the printhead. The head mount beam further incorporates a fan (35) with a corresponding fan filter (34) for positively pressurizing the interior to keep lint away from the heads and electronics.

It is contemplated that the wax- or polymer-based marking composition utilized in the present invention would be solid at ambient temperatures, heated and disbursed through the printheads as a liquid, and subsequently converted back into a solid when applied onto the cooler surface of the fabric. Because the ink is a hot melt, it does not penetrate or bleed through the fabric. Using a wax- or polymer-based hot melt composition also aids in keeping the characters as visible as possible and leaving them free of any smudges. It is further contemplated that the hot melt ink can be provided with or without a dye or pigment, and also that the ink can be made permanent or alternatively can be made removable by washing. It is also preferred that the ink be supplied in a solid pellet configuration, which is designed to optimize ease of loading with minimal chance for overfilling, and to guard against splashing and entry of dirt into the ink reservoir. With this configuration the color of the ink may also be easily changed for different types and colors of fabrics, with little waste of unused ink. A marking composition suitable for use in the present invention can be obtained from Spectra, Inc., Hanover, N.H.

Figure 4B:
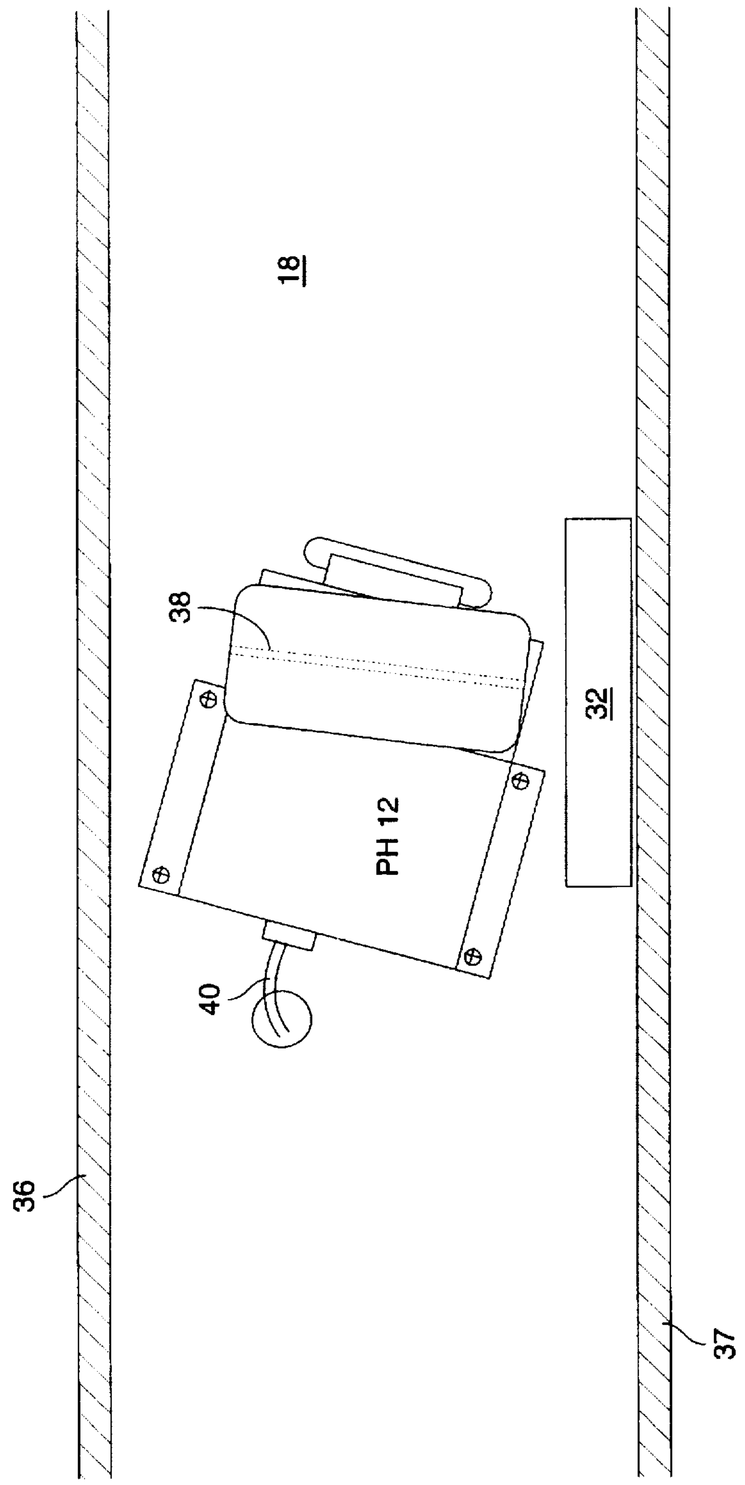
FIG. 4B is a close-up view of a printhead mounted on the Head Mount Beam, with the umbilical attachment.
Figure 5A:
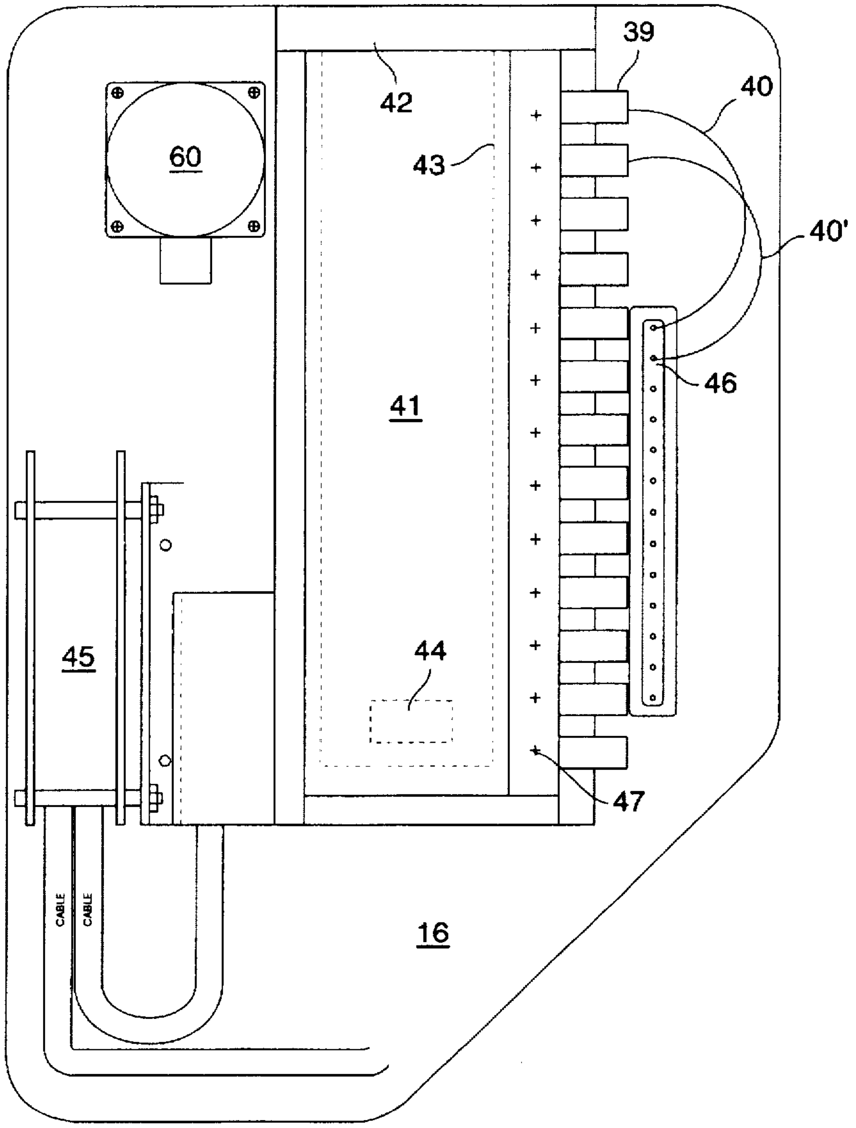
FIG. 5A is a side view of the right end of the Head Mount Beam, showing the ink reservoir and associated control boards and umbilicals.

As shown in FIGS. 4B and 5A, the printheads (PH1–PH13) are attached via umbilical lines (40) to a single, high capacity ink reservoir (41), preferably mounted on the Head Mount Beam (10). The ink reservoir (41) can be constructed of metal, plastic, or any other suitably rigid material. The ink reservoir further incorporates a cover (42) and a replaceable inlet filter basket (43). In the preferred embodiment, a cover interlock switch is provided to disable the printing mechanism, so that the system will not print and the spreader will not run with the cover open. In addition, the ink reservoir (41) is preferably designed so that ink pellets loaded through the top slide into the reservoir, rather than drop in, to minimize any splashing of the melted ink already in the reservoir (41).

It is further intended that a low-on-ink sensor (44) be incorporated into the ink reservoir (41), to interface with the central control means (20) and notify the operator when the ink reservoir reaches a predetermined level. In the preferred embodiment, the low-on-ink sensor (44) is first activated at 30 cc, providing ample time for the operator to refill the ink reservoir (41). The preferred embodiment further generates an out-of-ink signal when the ink level in the reservoir reaches 15 cc.

As noted above, the marking compositions of the present invention are preferably supplied in a solid state, and subsequently melted to form a molten composition which is applied to the passing fabric via the printheads. Accordingly, heating means are also provided for those parts of the system through which the molten composition is to flow. Such heating can be achieved by electrical heating elements around the appropriate ducts and/or umbilical lines or by any other suitable means. In the preferred embodiment the heating means consists of resistive wire in the umbilical lines (40) and a cartridge heater (not shown) in the reservoir (41).

It is intended that the printheads be maintained at a higher operating temperature than the ink reservoir. In the preferred embodiment the operating temperatures of the printheads and ink reservoir are 125° and 100° C., respectively. The umbilical lines (40) in effect operate as thermal valves, since only one umbilical line (40) at a time is heated, thereby allowing ink to flow from only that umbilical even if ink pressure is applied to all of the umbilical lines (40) simultaneously.

Separate control boards (45) are provided for the ink reservoir, with a corresponding serial communication link to communicate with the printhead circuit board sets (PCB1–PCB13) and the central control means (20). It is contemplated that any printhead (PH1–PH13) through its circuit boards (PCB1–PCB13) can request ink at any time, and that the ink reservoir control board (45) will automatically queue the request, heat the appropriate umbilical line (40) and dispense molten ink until the printhead signals "full" capacity. In addition, it is also contemplated that when the printheads (PH1–PH13) need ink for too long, the printhead circuit board sets (PCB1–PCB13) will produce a signal which allows the central control means (20) to disable the fabric handling device (5). As discussed above, it is also intended that both the out-of-ink and the cover-open conditions will create an output signal from the ink reservoir control board (45), which can also be used to disable the fabric handling device (5).

Figure 5B:
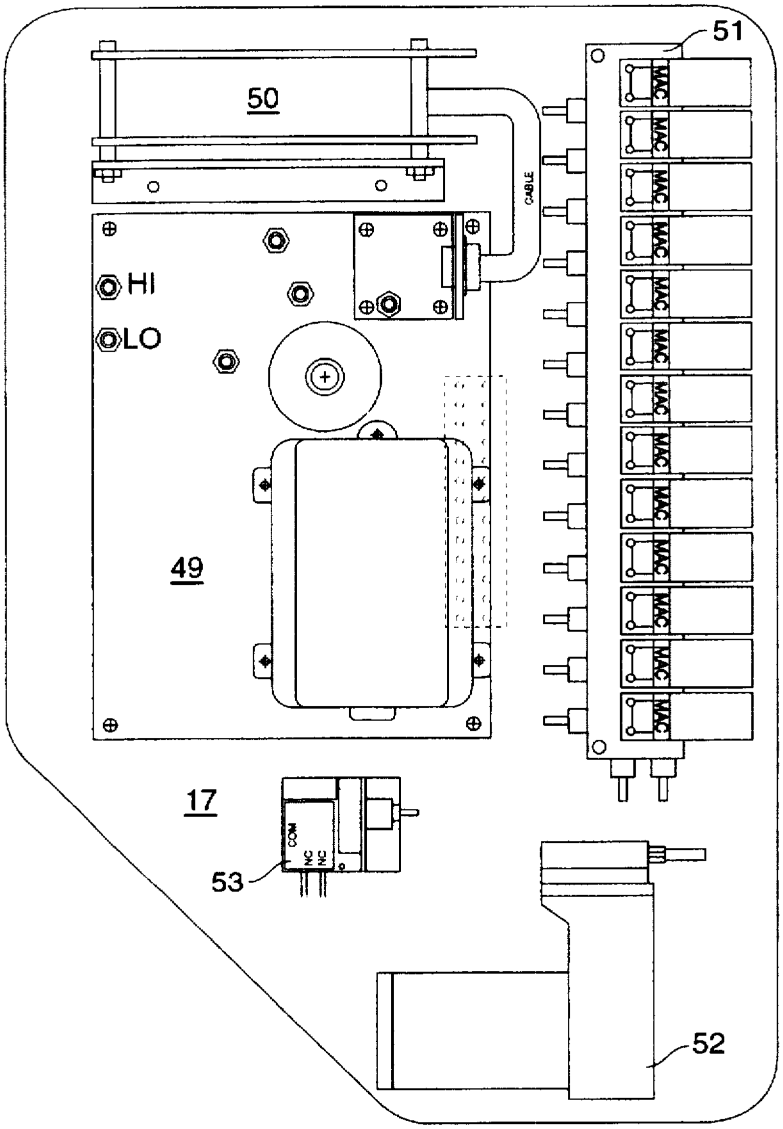
FIG. 5B is a side view of the left end of the Head Mount Beam, showing the pressure regulator control boards and solenoid valves.

A pressure regulator and valve system is also provided to interface with and to purge the printheads. See FIG. 5B. The pressure regulator system includes the pressure regulator control boards (50), solenoid valves (51), a vacuum pump (52) and switch (53), and interconnect tubing between the various components (not shown). The solenoid valves (51) are provided for sequentially purging each printhead, while automatically providing the proper negative meniscus pressure and "ink refresh" function. The pressure regulator control boards (50) control and sequence the valves and line pressure upon request from any printhead (PH1–PH13), or from the ink reservoir circuit boards (45). As shown in FIGS. 3 and 5, the pressure regulator system will preferably be located on the Head Mount Beam (10) along with the other components.

The present invention also incorporates an industrial encoder (60) (see FIG. 5A) which can track a driven roll (7) in the host spreading machine (5). It is contemplated that any conventional encoder device can be incorporated into the present invention, to register the movement of the fabric and establish fixed process direction resolution. In a preferred embodiment, the encoder consists of a Model H25 Incremental Optical Encoder, available from BEI Motion Systems Company of Goleta, Calif.

The central control means (20) of the present invention is programmed to receive input data from the operator on the fabric size and character selection and to automatically adjust the output of jet-mapped character data to the printheads accordingly. In the preferred embodiment, the central control means consists of a 486 class industrial PC, obtainable from any commercial manufacturer, with precomputed character bitmaps stored therein. The preconfigured jet-mapped character data stored in the central control means is supplied to the printheads in synchronism with the system encoder (60), so that the printing of the characters will be automatically synchronized with the spreader speed.

Figure 6:
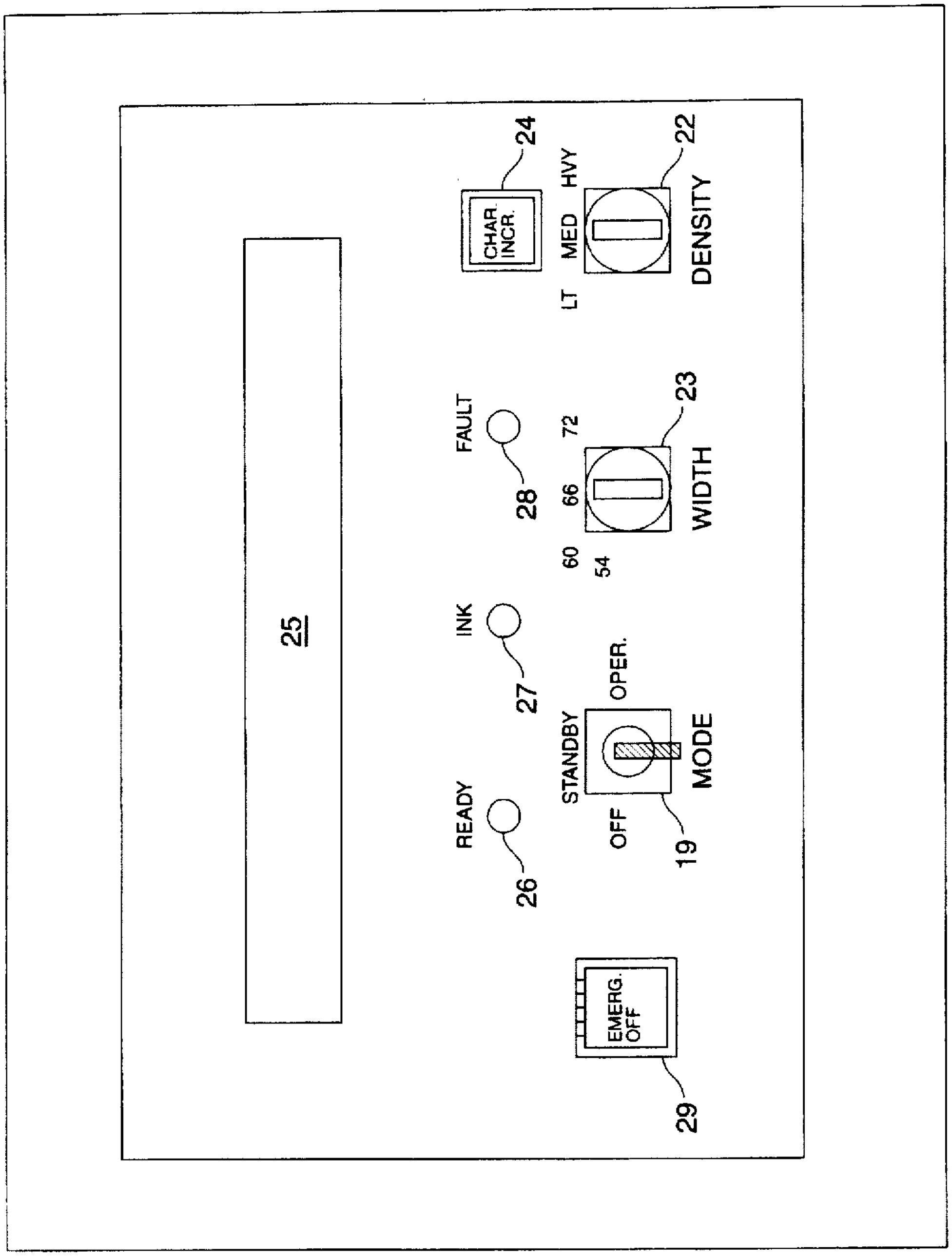
FIG. 6 is a front view of the operator control panel.

In a preferred embodiment, a separate operator control panel (21) as shown in FIG. 6 is provided for interfacing with the central control means, and is preferably located at the operator's workstation. In the preferred embodiment of the operator control panel (21), a three-position input switch (22) is provided to select between a light, medium or heavy character marking set, and an input means (23) is further provided for selecting between various roll widths. It is most preferred that the fabric on the spreading machine will always be right-side registered, and that inputing roll widths of less than the maximum will automatically disable printing from one or more printheads, starting from the left side of the Head Mount Beam. A manual character increment button (24) is also preferred, with a liquid crystal display (25) of the alpha-numeric character selected. Additional displays are also contemplated for showing system status (26), ink-level (27) and system fault (28).

It is contemplated that the printing system will have three different operating modes, controlled by a switch (19) on the operator control panel (21). In the Power Off mode, the heating elements are inactivated and the printheads (PH1–PH13) and reservoir (41) will attain the local ambient temperature. In the Operating Mode, the printheads (PH1–PH13) and the reservoir (41) are maintained at their preferred operating temperatures (nominally 125° and 100° C., respectively). Finally, in the Standby mode the printheads and reservoir temperatures are controlled to approximately 65° C., just below the melting point of the marking composition. This mode allows a faster warmup than the Power Off mode, and will prolong ink and printhead life while allowing for the handling of components without spillage problems. An emergency kill switch (29) is also provided on the operator control panel (21) in the case of an emergency situation requiring the shutdown of the whole machine.

The invention will now be illustrated by the following Example in which all parts and percentages are given by weight:

EXAMPLE 1

The contactless hot melt ink jet shademarking system of the present invention was mounted on sidebeams incorporated onto a Niebuhr fabric spreader model SY750, obtainable from Niebuhr/Gerber Garment Control Technologies, Tolland, Conn. A substrate consisting of a denim fabric material was processed through the fabric spreader. A marking composition was obtained from Spectra, Inc., Hanover, N.H., consisting of a cyan-colored hot melt ink with a melting temperature of approximately 70°–100° C. The marking composition was fed to 13 Model HDS 96i industrial printheads, also obtainable from Spectra, Inc., Hanover, N.H., which were mounted on the Head Mount Beam. The printheads were heated to maintain a temperature of 125° C. ±5°, while the umbilical lines were heated to a temperature of 100° C. ±5°.

The umbilical lines were pressurized to ~15 psi gauge and the molten composition printed through the printhead using a ~50 micron bore orifice to produce a series of separate droplets which formed discrete dot images on the passing denim substrate. The images were sharply defined, well anchored to the fabric and resistant to smudging. An example of the shademarked fabric according to the present invention is shown in FIG. 7.

While the shademarking system of the present invention has been described in terms of the preferred embodiment, one skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible without departing from the scope of the invention as set forth in the following claims.

I claim:

1. A hot melt ink jet shademarking system for marking for identification fabrics and textiles processed through a fabric handling device, comprising:

a. a head mount beam attached to the fabric handling device;

b. a series of hot melt ink jet printheads positioned along said head mount beam;

c. a hot melt ink reservoir coupled with each of said hot melt ink jet printheads;

d. means for pressurizing said hot melt ink jet printheads to a predetermined level;

e. means for heating a hot melt marking composition to a predetermined temperature in both said hot melt ink reservoir and said hot melt ink jet printheads during operation whereby said marking composition is applied in a molten state and solidifies on contact with the fabrics; and f. means in communication with said printheads, said reservoir, said means for pressurizing, and said means for heating for controlling an application of said hot melt marking composition in a molten state in a predetermined marking configuration to a fabric passing through the said fabrics handling device.

2. The hot melt ink jet shademarking system of claim 1, wherein said means for controlling is operatively connected with separate individual controllers associated with each of said hot melt ink jet printheads and said hot melt ink reservoir.

3. The hot melt ink jet shademarking system of claim 1, wherein said means for pressurizing includes a pressure supply and pressure regulator coupled to said hot melt ink reservoir and said hot melt ink jet printheads.

4. The hot melt ink jet shademarking system of claim 1, further comprising:

a means for detecting fabric passing from a driven roll through said fabric handling device and past said hot melt ink jet printheads.

5. The hot melt ink jet shademarking system of claim 1, further comprising:

top roller and bottom roller positioned on said head mount beam so as to direct a fabric substrate moving past said hot melt ink jet printheads located on said head mount beam; and a dancer bar mounted on said fabric handling device to maintain sufficient tension in the fabric passage, and to redirect the fabric passage away from the hot melt ink jet printheads after being has been shademarked.

6. The hot melt ink jet shademarking system of claim 1, wherein said hot melt ink reservoir further comprises:

a cover associated with said reservoir;

a replaceable inlet filter basket positioned inside said reservoir; and sensing means inside said reservoir and operatively connected to said means for controlling for providing a signal when said hot melt marking composition reaches a predetermined level in said hot melt ink reservoir.

7. The hot melt ink jet shademarking system of claim 6, wherein said cover further incorporates a means for disengaging power to said fabric handling device to prevent shademarking when said cover is opened.

8. The hot melt ink jet shademarking system of claim 1, wherein said means for heating the hot melt marking composition at a predetermined temperature in both said hot melt ink reservoir and said hot melt ink jet printheads further comprises:

resistive wire in each umbilical line coupling said hot melt ink reservoir to each hot melt ink jet printhead; and a heater in said reservoir.

9. The hot melt ink jet shademarking system of claim 3, wherein said pressure supply and regulator comprises:

a solenoid valve operatively connected to each of said plurality of ink jet printheads;

a vacuum pump operatively connected through said solenoid valves to said plurality of ink jet printheads; and a means in communication with said solenoid valves and said vacuum pumps for regulating pressure inside said printheads.

10. The hot melt ink jet shademarking system of claim 1, wherein said means for controlling automatically selects an appropriate marking configuration for maximum visibility and minimum ink consumption based on input fabric information.

11. The hot melt ink jet shademarking system of claim 1, wherein said means for controlling automatically determines which of the printheads are to be used for shademarking marking based upon the width of the fabric passing through the fabric handling machine.

12. An improved fabric handling device comprising a contactless shademarking device attached to a conventional fabric handling device for shademarking fabric passing through said fabric handling device with a hot melt marking composition.

13. The device claimed in claim 12 wherein said conventional fabric handling device is selected from the group consisting of a spreader and a loom.

14. The device according to claim 12, wherein said control means comprises a master controller operatively connected to separate individual controllers associated with each of said hot melt ink jet printheads, said hot melt ink reservoir, and said pressure regulator.

15. The device according to claim 14, further comprising a speed sensing means for detecting a speed of the fabric passing through said fabric handling device, said sensing means in communication with said master controller and generating a signal representative of said speed of the fabric which is used by the master controller to determine a frequency with which said printheads are fired to shademark the fabric as the fabric passes said printheads.

16. The device according to claim 12, further comprising:

top roller and bottom positioned on said frame so as to direct fabric passing through the fabric handling device past said hot melt ink jet printheads located on said frame; and a dancer bar mounted on said frame so as to redirect fabric moving past said hot melt ink jet printheads and to maintain sufficient tension in said fabric.

17. The device according to claim 12, wherein said hot melt ink reservoir further comprises:

a cover for covering an opening of said reservoir;

an inlet filter basket removably positioned inside said reservoir; and an ink level sensing means for detecting a predetermined hot melt ink level in said hot melt ink reservoir and for transmitting a signal to said master controller when said predetermined hot melt ink level is reached.

18. The device according to claim 17, wherein said cover further incorporates a means for disengaging power to said fabric handling device to prevent shademarking when said cover is opened.

19. The device according to claim 12, wherein said means for maintaining the hot melt ink jet marking composition at a predetermined temperature in both said hot melt ink reservoir and said hot melt ink jet printheads comprises a resistive wire in each conduit between said hot melt ink reservoir and said hot melt ink jet printheads; and, a heater in said reservoir.

20. The device according to claim 12, wherein said pressure supply comprises:

a solenoid valve operatively connected to each of said plurality of ink jet printheads;

a vacuum pump operatively connected through said solenoid valves to said plurality of ink jet printheads; and a means in communication with said solenoid valves and said vacuum pump for regulating pressure inside said printheads.

21. The device according to claim 12, wherein said control means automatically selects an appropriate marking configuration for maximum visibility and minimum ink consumption based on input fabric information.

22. The improved fabric handling device according to claim 12, wherein said control means automatically selects the printheads for shademarking based upon a width of the fabric being shademarked.

* * * * *

CERTIFICATE OF CORRECTION

PATENT NO. : 5,793,398
DATED : 11/29/95
INVENTOR(S) : CYTHNIA LOU HENNIG

It is certified that error appears in the above-indentified patent and that said Letters Patent is hereby corrected as shown below: On the title page, item [54]:

IN THE REFERENCES CITED - FOREIGN PATENT DOCUMENTS

On the Cover Sheet, please add:

| | | |
|---|---|---|
| 03253344A | 11/1991 | JAPAN |
| 05084901A | 4/1993 | JAPAN |
| 05305714A | 11/1993 | JAPAN |
| 62117750A | 6/1987 | JAPAN |

IN THE DETAILED DESCRIPTION OF THE INVENTION

At Col. 6, lines 63-65, please delete the sentence: "An example of the shademarked fabric according to the present invention is shown in FIG. 7."

IN THE CLAIMS

In CLAIM 1, line 30, please add -- , -- after the word "heating".

In CLAIM 1, line 32, please delete "a fabric" and add --said fabrics--.

In CLAIM 1, line 33, please delete "said fabrics" and add --fabric--.

In CLAIM 5, line 56, please delete "fabric passage" and add --passing fabric--.

In CLAIM 5, line 57, please delete "fabric passage" and add --passing fabric--.

In CLAIM 5, line 58, please delete "being" and add --said fabric--.

In CLAIM 11, line 29, please delete "to be" and add --being--.

CERTIFICATE OF CORRECTION

PATENT NO. : 5,793,398
DATED : 11/29/95
INVENTOR(S) : CYTHNIA LOU HENNIG

It is certified that error appears in the above-indentified patent and that said Letters Patent is hereby corrected as shown below:

IN THE CLAIMS (continued)

In CLAIM 11, line 30, please delete "the width" and add --a width--.

In CLAIM 11, line 30, please delete "fabric" and add --fabrics--.

In CLAIM 12, lines 32-36, please delete all of CLAIM 12 and replace it with the following:

--12. An improved fabric handling device comprising:
a contactless shademarking device attached to a conventional fabric handling device for shademarking fabric passing through said fabric handling device with a hot melt marking composition; wherein said contactless shademarking device comprises:
a frame attached to the fabric handling device;
a plurality of hot melt ink jet printheads positioned along said frame;
a hot melt ink reservoir;
a conduit for coupling each of said hot melt ink jet printheads to said reservoir;
a pressure supply, including a pressure regulating means coupled to said hot melt ink jet printheads;
means for maintaining a hot melt marking composition at a predetermined temperature in both said hot melt ink reservoir and said hot melt ink jet printheads during operation so that said hot melt marking composition is applied in a molten state and solidifies on contact with fabric; and

UNITED STATES PATENT AND TRADEMARK OFFICE

CERTIFICATE OF CORRECTION

PATENT NO. : 5,793,398

DATED : 11/29/95

INVENTOR(S) : CYTHNIA LOU HENNIG

It is certified that error appears in the above-indentified patent and that said Letters Patent is hereby corrected as shown below:

IN THE CLAIMS (continued)

In CLAIM 12 (continued)

control means in communication with said printheads, said means for maintaining a hot melt marking composition at a predetermined temperature, and said pressure supply for controlling an application of the hot melt marking composition in a molten state in a predetermined marking configuration to a fabric passing through the fabric handling device.--

In CLAIM 16, line 54, please insert --roller-- after "bottom".

Signed and Sealed this

Twenty-seventh Day of July, 1999

Attest:

Q. TODD DICKINSON

Attesting Officer

*Acting Commissioner of Patents and Trademarks*